United States Patent
Jeong et al.

(10) Patent No.: US 10,051,512 B2
(45) Date of Patent: Aug. 14, 2018

(54) METHOD AND APPARATUS FOR CONTROLLING TRAFFIC IN WIRELESS COMMUNICATION SYSTEM

(71) Applicant: Samsung Electronics Co., Ltd., Gyeonggi-do (KR)

(72) Inventors: Sang-Soo Jeong, Gyeonggi-do (KR); Song-Yean Cho, Seoul (KR); Beom-Sik Bae, Suwon-si (KR); Young-Kyo Baek, Seoul (KR); Sung-Hwan Won, Seoul (KR); Han-Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 14/158,668

(22) Filed: Jan. 17, 2014

(65) Prior Publication Data

US 2014/0204754 A1    Jul. 24, 2014

(30) Foreign Application Priority Data

Jan. 18, 2013   (KR) ........................ 10-2013-0005839

(51) Int. Cl.
| | | |
|---|---|---|
| H04W 4/00 | (2018.01) | |
| H04W 28/02 | (2009.01) | |
| H04W 88/14 | (2009.01) | |
| H04W 88/16 | (2009.01) | |
| H04W 92/24 | (2009.01) | |

(52) U.S. Cl.
CPC ... *H04W 28/0289* (2013.01); *H04W 28/0231* (2013.01); *H04W 88/14* (2013.01); *H04W 88/16* (2013.01); *H04W 92/24* (2013.01)

(58) Field of Classification Search
CPC ......... H04W 28/0231; H04W 28/0289; H04W 88/14; H04W 88/16; H04W 92/24
See application file for complete search history.

(56) References Cited

U.S. PATENT DOCUMENTS

| | | | |
|---|---|---|---|
| 8,170,566 B2 | 5/2012 | Pudney | |
| 2006/0199579 A1* | 9/2006 | Chitrapu | H04L 12/6402 455/428 |

(Continued)

FOREIGN PATENT DOCUMENTS

| | | |
|---|---|---|
| CN | 102215544 A | 10/2011 |
| EP | 2448321 A1 | 5/2012 |

(Continued)

OTHER PUBLICATIONS

Extended European Search Report dated Sep. 9, 2014 in connection with European Application No. 14151596.5; 16 pages.

(Continued)

*Primary Examiner* — Charles C Jiang
*Assistant Examiner* — Ryan Kavleski (57) ABSTRACT

Provided is a method for transmitting traffic control information by an Evolved Node B (ENB) in a wireless communication system. The method includes transmitting congestion state information a traffic control node. The congestion state information is used to control traffic for a User Equipment (UE) that is accessing the ENB. And, the congestion state information includes information about a congestion state of the ENB, and is included in a packet header transmitted from the UE.

20 Claims, 8 Drawing Sheets

(56) References Cited

U.S. PATENT DOCUMENTS

| | | |
|---|---|---|
| 2007/0259673 A1 | 11/2007 | Willars et al. |
| 2009/0285099 A1 | 11/2009 | Kahn et al. |
| 2009/0305707 A1 | 12/2009 | Pudney |
| 2011/0280130 A1 | 11/2011 | Foottit et al. |
| 2012/0170454 A1* | 7/2012 | Takano ............... H04W 8/082 370/230 |
| 2012/0257499 A1 | 10/2012 | Chatterjee et al. |
| 2012/0264443 A1 | 10/2012 | Ng et al. |
| 2013/0039244 A1* | 2/2013 | Sun ............... H04W 52/0235 370/311 |
| 2013/0058292 A1 | 3/2013 | Wang et al. |
| 2014/0022900 A1* | 1/2014 | Salot ............... H04W 28/0205 370/235 |
| 2014/0022904 A1* | 1/2014 | Ahmad ............ H04W 28/0289 370/235 |
| 2014/0026169 A1* | 1/2014 | Ye ............... H04L 47/35 725/62 |
| 2014/0119192 A1 | 5/2014 | Koshimizu et al. |
| 2014/0133296 A1* | 5/2014 | Johansson ......... H04W 72/1252 370/230 |
| 2014/0233390 A1* | 8/2014 | Schmid ............... H04L 47/125 370/236 |
| 2015/0036496 A1* | 2/2015 | Shan ............... H04W 74/02 370/235 |
| 2015/0092576 A1* | 4/2015 | Vaidya ............... H04L 47/11 370/252 |
| 2015/0236985 A1* | 8/2015 | Chandramouli .... H04L 49/9057 370/328 |
| 2016/0112896 A1* | 4/2016 | Karampatsis ..... H04W 28/0252 370/230.1 |

FOREIGN PATENT DOCUMENTS

| | | |
|---|---|---|
| EP | 2512176 A1 | 10/2012 |
| EP | 2 547 150 A1 | 1/2013 |
| WO | WO 2007/129045 A1 | 11/2007 |
| WO | WO 2011/003089 A1 | 1/2011 |
| WO | WO 2011/052136 A1 | 5/2011 |
| WO | 2012028972 A1 | 3/2012 |
| WO | WO 2013/008607 A1 | 1/2013 |

OTHER PUBLICATIONS

International Search Report dated Apr. 21, 2014 in connection with International Patent Application No. PCT/KR2014/000562, 3 pages.

Written Opinion of the International Searching Authority dated Apr. 21, 2014 in connection with International Patent Application No. PCT/KR2014/000562, 6 pages.

T-Mobile, et al., "S1-U TNL Congestion Indication", R3-080861, 3GPP TSG-RAN WG3 Meeting #59bis, Shenzhen, China, Apr. 3, 2008, 3 pages.

3GPP TR 25.902 V7.1.0, "3rd Generation Partnership Project; Technical Specification Group Radio Access Network; Iub/Iur Congestion Control, (Release 7)", Mar. 23, 2007, 14 pages.

Qualcomm Incorporated, "TCP Performance Evaluation of SF-DC Inter NodeB Aggregation Assuming Realistic RLC, Flow Control and Iub Congestions Control", R1-112686, 3GPP TSG RAN WG1 Meeting #66, Athens, Greece, Aug. 26, 2011, 10 pages.

Partial European Search Report dated May 28, 2014 in connection with European Application No. 14151596.5, 8 pages.

3GPP TR UPCON V0.1.0, "3rd Generation Partnership Project; Technical Specification Group Services and System Aspects; System Enhancements for User Plane Congestion Management (Release 12)", Mobile Competence Centre, 650, Route Des Lucioles,; F-06921, Sophia-Antipolis Cedex, France, Nov. 2011, 9 pages.

KDDI, S2-124462, "UPCON Key Issues", SA WGS Meeting #94, New Orleans, Louisiana, Nov. 12-16, 2012, 2 pages.

Nec, et al., "Key Issues for UPCON", SA WG2 Meeting #94, S2-124763, New Orleans, Louisiana, Nov. 12-16, 2012, 5 pages.

Communication from a foreign patent office in a counterpart foreign application, "The First Office Action," Chinese Patent Application No. 201480005041.8, 15 pages.

\* cited by examiner

FIG.13

METHOD AND APPARATUS FOR CONTROLLING TRAFFIC IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jan. 18, 2013 and assigned Serial No. 10-2013-0005839, the entire disclosure of which both of which is incorporated herein by reference.

TECHNICAL FIELD

The present disclosure relates to a method and apparatus for controlling traffic in a wireless communication system.

BACKGROUND

Figure 1:
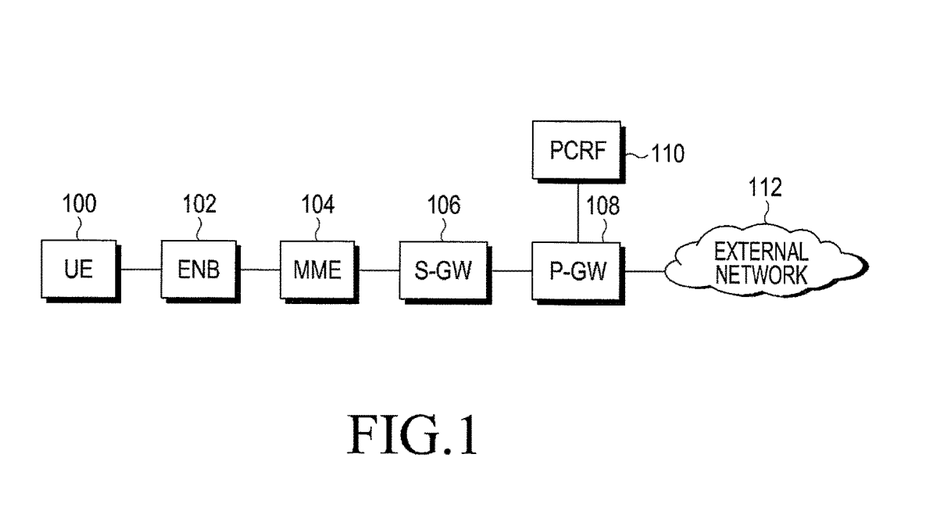
FIG. 1 illustrates a configuration of the conventional LTE network.

A Radio Access Network (RAN) for a Long Term Evolution (LIE) communication system is illustrated in FIG. 1.

FIG. 1 illustrates a configuration of the conventional LTE network.

Referring to FIG. 1, the LTE network may include a User Equipment (UE) 100, an Evolved Node B (ENB) (also known as EUTRAN) 102, a Mobility Management Entity (MME) 104, a Serving-Gateway (S-GW) 106, a PDN (Packet Data Network)-Gateway (P-GW) 108, and a Policy and Charging Rules Function (PCRF) 110.

The UE 100 may access an external network 112 via the ENB 102, the S-GW 106 and the P-GW 108. The UE 100 may exchange application-related information with an Application Function (AF) (not shown).

The ENB 102, a Radio Access Network (RAN) node, may correspond to a Radio Network Controller (RNC) of the Universal Terrestrial Radio Access Network (UTRAN) system, and a Base Station Controller (BSC) of the GSM (Global System for Mobile communication) EDGE (Enhanced Data rate for GSM Evolution) Radio Access Network (GERAN) system. The ENB 102 may be connected to the UE 100 over a wireless channel, and may perform an operation similar to the operation performed by the existing RNC/BSC. In the LIE network, all user traffic including the traffic based on real-time services such as Voice over Internet Protocol (VoIP) may be serviced over a shared channel. Therefore, the ENB 102 may perform scheduling by collecting state information of UEs.

The MME 104, a device responsible for various control functions, may be connected to a plurality of ENBs. The MME 104 may manage Evolved Packet Core (EPC) bearers generated among the UE 100, the ENB 102, the S-GW 106 and the P-GW 108. The MME 104 may authenticate the UE 100 and manage a mobility state of the UE 100.

The S-GW 106, a device for providing EPC bearers, may generate or remove EPC bearers under control of the MME 104. The P-GW 108 may assign an IP address to the UE 100, and apply a UE-specific Quality of Service (QoS) policy (e.g., priority, bandwidth control and the like). In the LTE network, the QoS policy may be applied in units of EPC bearers, and one EPC bearer may be used to transmit IP signals having the same QoS requirements. A QoS-related parameter may be designated for the EPC bearer, and this parameter may include a QoS Class Identifier (QCI), Allocation and Retention Priority (ARP), and the like. The EPC bearer may correspond to a Packet Data Protocol (PDP) context of the General Packet Radio Service (GPRS) system.

The PCRF 110 is a device for determining and collectively controlling UE-specific QoS policy and charging. The PCRF 110 may provide a Policy and Charging Control (PCC) rule for a UE to the P-GW 108.

In this LIE network, a path among the UE 100, the ENB 102, the S-GW 106 and the P-GW 108, which is a path in which user data is transmitted and received, is commonly referred to as 'UP'. In the UP, in a path between the UE 100 and the ENB 102 may be used a wireless channel having the most severe resource limitations. Therefore, the ENB 102 needs to perform data exchange with the UE 100 using the limited frequency.

If the number of users increases or the traffic transmitted/received by the users increases in a cell managed by the ENB 102, congestion may occur in the ENB 102. In this congestion situation, in order to cope with the congestion without degrading the user experience QoS, there is a need to control traffic taking into account the user attributes or the service application. Conventionally, however, there is no way to make it possible to effectively perform traffic control according to the congestion.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide at least the advantages described below. Accordingly, an aspect of the present disclosure is to provide a method and apparatus for controlling traffic in a wireless communication system.

Another aspect of the present disclosure is to provide a method and apparatus for controlling traffic for a User Equipment (UE) connected to a cell that is in a congestion state in a wireless communication system.

Another aspect of the present disclosure is to provide a method and apparatus for effectively informing whether a UE is accessing a congested cell.

Another aspect of the present disclosure is to provide a method and apparatus for allowing a specific network node to accurately determine whether an idle mode is performed by a UE.

Another aspect of the present disclosure is to provide a method and apparatus for accurately determining location information of a UE, to provide a service suitable for a state of the UE even if the UE has undergone handover.

In accordance with an aspect of the present disclosure, there is provided a method for transmitting traffic control information by an Evolved Node B (ENB) in a wireless communication system. The method includes transmitting congestion state information to a traffic control node. The congestion state information is used to control traffic for a User Equipment (UE) being served by the ENB. The congestion state information may include information about a congestion state of the ENB, and is included in a packet header transmitted from the UE.

In accordance with another aspect of the present disclosure, there is provided a method for transmitting state information of a User Equipment (UE) by a first network node in a wireless communication system. The method includes determining whether one of a connection mode and an idle mode is performed by the UE; generating state information of the UE based on a result of the determination; and transmitting the generated state information of the UE to a second network node that performs traffic control.

In accordance with further another aspect of the present disclosure, there is provided a method for determining a state of a User Equipment (UE) by a first network node in a wireless communication system. The method includes receiving state information of the UE from a second network node; starting a timer, if it is determined that a connection mode is performed by the UE, based on the state information of the UE; determining whether a packet is received before the timer expires; and determining that a mode of the UE is switched from the connection mode to an idle mode, based on a result of the determination.

In accordance with yet another aspect of the present disclosure, there is provided an Evolved Node B (ENB) in a wireless communication system. The ENB includes a transmitter for transmitting congestion state information to a traffic control node. The congestion state information is used to control traffic for a User Equipment (UE) being served by the ENB. And, the congestion state information may include information about a congestion state of the ENB, and is included in a packet header transmitted from the UE.

In accordance with still another aspect of the present disclosure, there is provided a first network node in a wireless communication system. The first network node includes a controller for determining whether one of a connection mode and an idle mode is performed by a User Equipment (UE), and generating state information of the UE based on the determination results; and a transmitter for transmitting the generated state information of the UE to a second network node that performs traffic control.

In accordance with still another aspect of the present disclosure, there is provided a first network node in a wireless communication system. The first network node includes a receiver for receiving state information of a User Equipment (UE) from a second network node; a controller configured to; start a timer, if it is determined that a connection mode is performed by the UE, based on the state information of the UE; determine whether a packet is received before the timer expires; and determine that a mode of the UE is switched from the connection mode to an idle mode, based on a result of the determination.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

FIGS. 2 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure will be described below based on the basic 3rd Generation Partnership Project (3GPP) Long Term Evolution (LTE) communication system. However, it will be apparent to those of ordinary skill in the art that embodiments of the present disclosure may be applied to any communication/computer systems having the technical background and system configuration similar to those of the LIE communication system, without departing from the scope of the present disclosure.

For example, embodiments of the present disclosure, which are based on the LIE communication system, may be applied to the Universal Terrestrial Radio Access Network (UTRAN)/GSM EDGE Radio Access Network (GERAN) system having the system configuration similar to that of the LTE communication system. In this case, an Evolved Node B (ENB) (or a Radio Access Network (RAN) node) may correspond to a Radio Network Controller (RNC)/Base Station Controller (BSC) of the UTRAN/GERAN system; an S-GW may be removed or incorporated into a Serving GPRS (General Packet Radio Service) Support Node (SGSN); and a P-GW may correspond to a Gateway GPRS Support Node (GGSN). In addition, a bearer of the LTE communication system may correspond to a Packet Data Protocol (PDP) context of the UTRAN/GERAN system.

In embodiments of the present disclosure, a process of delivering congestion state information for controlling congestion of a RAN to a P-GW will be brought into focus, for convenience of description. However, it will be apparent to those of ordinary skill in the art that a process of delivering the congestion state information to another node (e.g., Traffic Detection Function (TDF) or Policy and Charging Rules Function (PCRF)) in the core network may be applied, without departing from the scope of the present disclosure.

On the other hand, in embodiments of the present disclosure, a RAN, a RAN node, an ENB and a cell are all used in the similar concept, and are interchangeable. Similarly, a P-GW and a Policy and Charging Enforcement Function (PCEF) are interchangeable.

The present disclosure provides a method and apparatus for controlling traffic in a wireless communication system. Specifically, the present disclosure provides a first method of informing a congestion state of a RAN, a second method of making it possible to determine a state of a UE in an idle mode, and a third method of transmitting location information of a UE. Each of the three methods will be described in detail below.

First, the first method among the three methods will be described below.

Generally, a RAN node may hardly identify the detailed subscription information of a user or the information about a service application in use. Therefore, a method may be used, in which a P-GW (or one (e.g., TDF or the like) of the entities for delivering packets in the core network), via which downlink traffic is passed, processes the traffic taking into account a congestion state of a RAN. This method may be effectively used, as the downlink traffic occupies most of the traffic transmitted in a wireless communication network.

However, for the use of this method, the state of the RAN node needs to be delivered to the P-GW. Given that a traffic congestion state of the RAN node is variable over time, there is a need to effectively inform a congestion state of the RAN node without increasing the signaling load.

Therefore, in order to inform a congestion state of the RAN node of a core network or a node (hereinafter referred to as an 'execution node') (e.g., MME, P-GW, PCRF, TDF and the like) that determines whether to transmit traffic), control plane signaling (hereinafter referred to as 'control signaling') may be used. The control signaling may be used to send a control message for informing a congestion state to another entity.

The method of informing a congestion state using the control signaling is advantageous in that its meanings and uses are clear, but may have disadvantages of increasing the signaling load in the network. That is, if control signaling is used to inform a RAN's congestion state which is variable over time, congestion of the control plane may be caused in order to relieve the congestion of a user plane. In order to solve these problems, an embodiment of the present disclosure provides a way to inform a congestion state using user plane messages.

Figure 2:
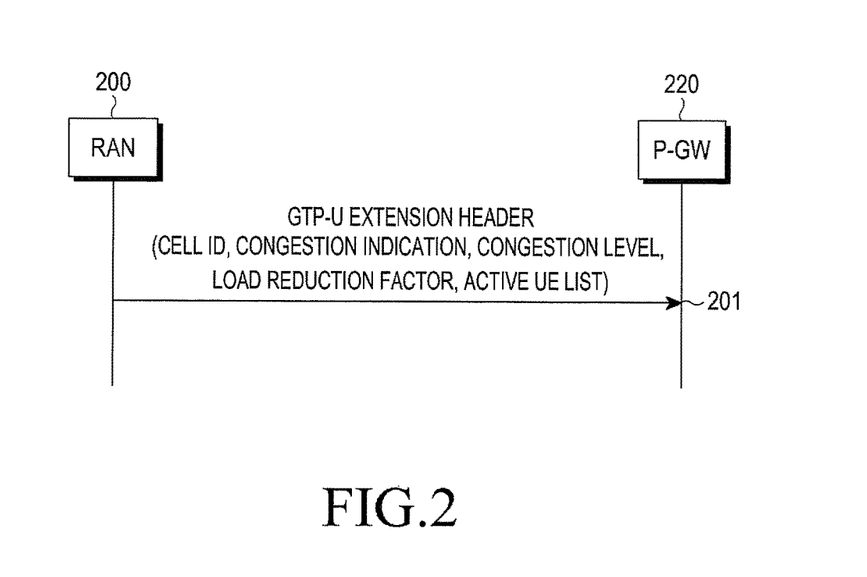
FIG. 2 is a signal flow diagram illustrating a process of transmitting and receiving congestion state information according to an embodiment of the present disclosure.

FIG. 2 is a signal flow diagram illustrating a process of transmitting and receiving congestion state information according to an embodiment of the present disclosure.

Referring to FIG. 2, a RAN node 200 may transmit congestion state information as RAN congestion information to a P-GW 220 in operation 201. The congestion state information may include a cell Information Element (IE) (e.g., a cell Identifier (ID) or a RAN node's ID), congestion indication indicating whether congestion occurs, a congestion level (which can be expressed as percentage information indicating a degree of congestion or as a level corresponding to the degree of congestion, and which indicates severeness of congestion), a load reduction factor indicating an amount of load that needs to be reduced for congestion control, and an active UE list including UEs which belong to the RAN and are in an active state (or a connection mode). The congestion state information may be transmitted using a tunnel header of a user data packet (or user-plane data packet).

The tunnel header of the user data packet may be a header of a GPRS Tunneling Protocol-User plane (GTP-U) packet, via which an IP packet transmitted by a UE is transmitted from a RAN node to a P-GW. The GTP-U packet, as illustrated in Table 1 below, may include a GTP-U header and an extension header for packet control for a tunnel between nodes, and the congestion state information may be included in the extension header.

TABLE 1

| GTP-U header | Extension header (next extension header type = congestion status) |
|---|---|

Specifically, the extension header may be defined as illustrated in Table 2 below.

TABLE 2

| Length | Congestion state information (cell ID, congestion indication, congestion level, load reduction factor, active UE list) | Next extension header (Optional) |
|---|---|---|

Referring to Table 2, the extension header may include a length field, a contents field, and a next extension header. The length field may include information about a length of the extension header, and the contents field may include at least one of the cell ID, the congestion indication, the congestion level, the load reduction factor and the active UE list, which are included in the congestion state information. The next extension header may be optionally used, and may not exist in some cases.

Upon receiving the extension header of the GTP-U message, in which the congestion state info ration is included, the P-GW 220, based on the congestion state information, may determine whether the RAN is congested, determine a degree of congestion, determine the amount of load that needs to be reduced, and determine information about UEs which are subject to congestion control. Based on the determined information, the P-GW 220 may perform traffic control for managing congestion according to the rules which are set in advance or set by a control node such as a PCRF.

Although it is assumed in FIG. 2 that the congestion state information is transmitted to a P-GW, the congestion state information may be transmitted to another node (e.g., S-GW) or other nodes (e.g., MME, P-GW, PCRF, PCEF, Bearer Binding and Event Reporting Function (BBERF), TDF and the like) that determine whether to transmit traffic, in the core network instead of the P-GW. The congestion state information may be included in a header of another type of a tunneling protocol (e.g., Proxy Mobile IPv6 (PMIPv6) and the like) message, instead of the extension header of the GTP-U message.

In addition, although the RAN node 200 may directly transmit a packet to the next hop entity, in a case where core network nodes are configured in a multi-hop manner, the congestion state information that is generated by the RAN node 200 and delivered to the next hop node via a GTP-U header may be delivered using the same method even in the next hop node.

Next, the second method of making it possible to determine a state of a UE in an idle mode according to an embodiment of the present disclosure will be described in detail below.

Generally, upon receiving a packet for a specific UE, a P-GW may use the congestion control method if a RAN being accessed by the UE is in a congestion state. However, if this method is used, the problems illustrated in FIG. 3 may occur.

Figure 3:
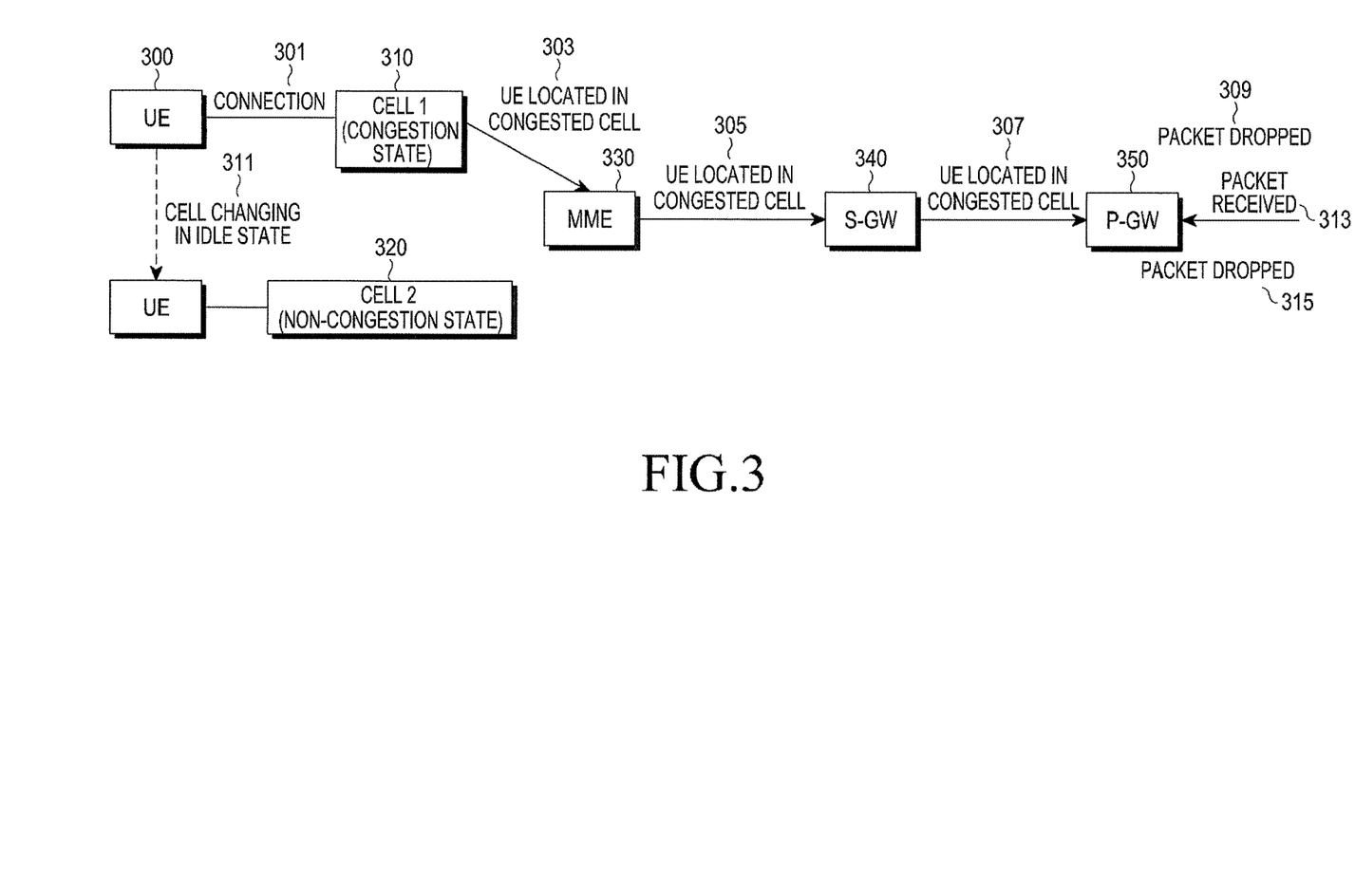
FIG. 3 illustrates congestion control in a wireless communication system.

FIG. 3 illustrates congestion control in a wireless communication system.

Referring to FIG. 3, a UE 300 may be connected to a first RAN node managing a first cell 310, in operation 301. If the first RAN node is in a congestion state, the first RAN node may send to an MME 330 a message indicating that the UE 300 is located in a congested cell, in operation 303. The MME 330 may send the message to an S-GW 340 in operation 305, and the S-GW 340 may send the message to a P-GW 350 in operation 307. Then, the P-GW 350 may drop the packets to be transmitted to the UE 300 in operation 309, recognizing based on the message that the UE 300 is located in a congested cell.

In operation 311, the UE 300 may change its state by switching from a connection mode to an idle mode while receiving a service from the first cell 310 which is a congested cell. In the idle mode, the UE 300 may move to a second cell 320 which is not congested. In this case, the P-GW 350 may determine that the UE 300 is still connected to the congested cell, as the P-GW 350 cannot identify the change in state of the UE 300. Accordingly, if packets to be transmitted to the UE 300 are received in operation 313, the P-GW 350 may continue to drop the packets to be transmitted to the UE 300. Therefore, the UE 300 may not receive the service, even though the UE 300 can successfully receive packets as it is out of the congested cell.

Therefore, an embodiment of the present disclosure provides a way to solve these problems.

As a first solution, an embodiment of the present disclosure may provide the following method. Upon recognizing that a mode of a UE is switched from a connection mode to an idle mode, a network node (e.g., a RAN node or an S-GW) may inform an execution node (e.g., P-GW, PCEF, BBERF, or TDF) that the mode of the UE is the idle mode. Upon recognizing that the mode of the UE is the idle mode, the execution node may store the UE's connection state caused by the idle mode as one-context information, and use the context information to perform traffic transmission control for the RAN node in a congestion state. In this method, traffic transmission control for the RAN in a congestion state may not be applied for the UE in the idle mode.

This method will be described in detail with reference to FIG. 4.

Figure 4:
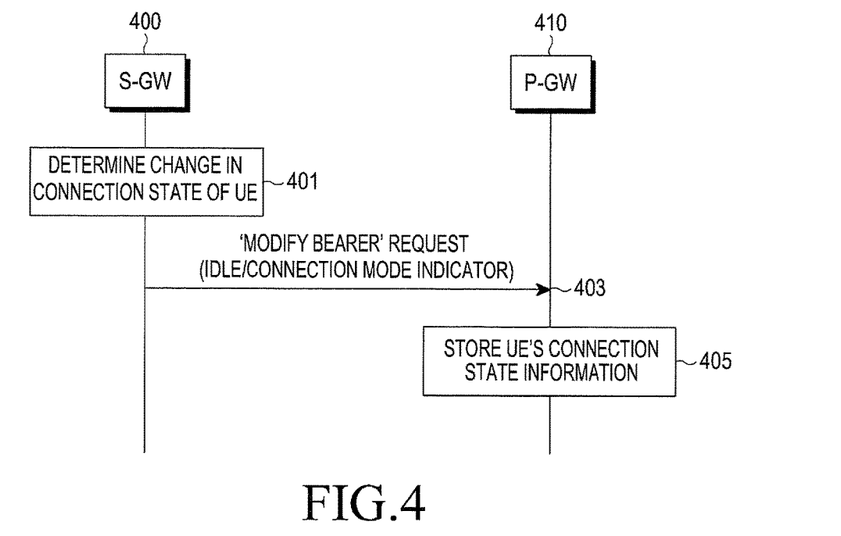
FIG. 4 is a signal flow diagram illustrating a process of transmitting UE's state information according to an embodiment of the present disclosure.

FIG. 4 is a signal flow diagram illustrating a process of transmitting UE's state information according to an embodiment of the present disclosure.

Referring to FIG. 4, an S-GW 400 may determine a change in connection state of a UE in operation 401. For example, upon receiving a 'Release Access Bearers' request message from an MME, the S-GW 400 may determine that a connection state of the UE is changed to a state corresponding to an idle mode. Upon receiving a 'Modify Bearer' request message from the MME, the S-GW 400 may determine that a connection state of the UE is changed to a state corresponding to a connection mode.

If it is determined that the connection state of the UE is changed, the S-GW 400 may send a 'Modify Bearer' request message including the UE's connection state information to a P-GW 410 in operation 403. The UE's connection state information may be expressed by a mode indicator, and the mode indicator may be set to a different value depending on whether the mode used by the UE is the connection mode or the idle mode. For example, the mode indicator may be set to '1' if the mode used by the UE is the connection mode, and the mode indicator may be set to '0' if the mode used by the UE is the idle mode.

Upon receiving the 'Modify Bearer' request message, the P-GW 410 may determine whether the mode used by the UE is the idle mode or the connection mode, based on the mode indicator included in the 'Modify Bearer' request message. In operation 405, the P-GW 410 may store the determination results, and use the stored info ration to determine whether to perform traffic transmission control for the UE connected to the cell in a congestion state.

The method illustrated in FIG. 4 is advantageous in that it is simple. However, its signaling load and processing load may be large, because the UE's connection state information needs to be reported to the execution node if a connection state of one UE is changed. In order to solve these problems, a network node knowing a state (connection state, location or the like) of a UE may store the UE's state information in advance and deliver the information to other network nodes at a time at stated intervals. This method will be described in detail with reference to FIG. 5.

Figure 5:
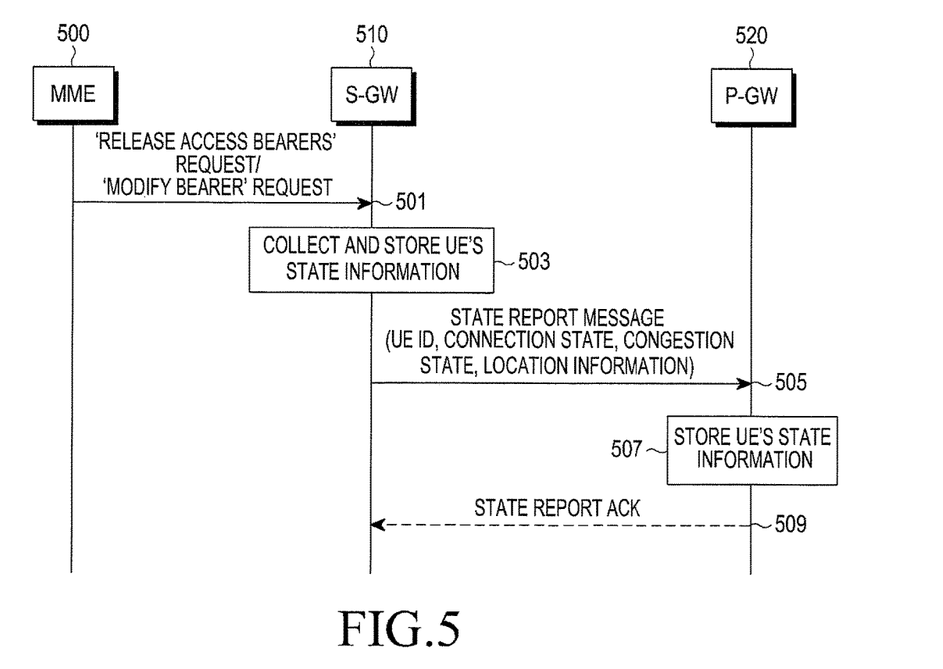
FIG. 5 is a signal flow diagram illustrating a process of periodically transmitting UE's state information according to an embodiment of the present disclosure.

FIG. 5 is a signal flow diagram illustrating a process of periodically transmitting UE's state information according to an embodiment of the present disclosure.

Referring to FIG. 5, an MME 500 may send a 'Release Access Bearers' request message or a 'Modify Bearer' request message to an S-GW 510 in operation 501. In response, the S-GW 510 may obtain the UE's state information (connection state information or location information) based on the 'Release Access Bearers' request message or the 'Modify Bearer' request message in operation 503. The S-GW 510 may collect the UE's state information for a preset period of time, and store the collected information.

The S-GW 510 may detect the information that needs to be reported to a P-GW 520 due to a change in contents in the obtained UE's state information, and generate a state report message including the detected information. In operation 505, the S-GW 510 may send the generated state report message to the P-GW 520.

The state report message may be sent at preset periods, and may include an ID of the UE, connection state information (including information indicating whether the UE's mode is a connection mode or an idle mode) of the UE, and the last location information of the UE. If information indicating that the connection mode is performed by the UE is included in the UE's connection state information, the state report message may include congestion state information indicating whether a RAN connected to the UE is congested.

Upon receiving the state report message, the P-GW 520 may store information included in the state report message in operation 507. In operation 509, the P-GW 520 may send a state report Acknowledgement (ACK) message, which is a response message to the state report message, to the S-GW 510. The P-GW 520 may use the stored information to perform traffic transmission control for a congested RAN.

Another method of making it possible to determine UE's state information is a method of determining the UE's connection state based on whether a packet is received from an execution node within a preset time. Generally, in a connection mode, a UE may transmit a packet using an uplink while receiving a packet using a downlink. If the UE transmits/receives no packet in the connection mode for a certain time, the UE may commonly switch to the idle mode. Given this, if there is no packet transmitted and received to/from a specific UE for a predetermined time, the execution mode may that the UE is switched to the idle mode. This process will be described in detail with reference to FIG. 6.

Figure 6:
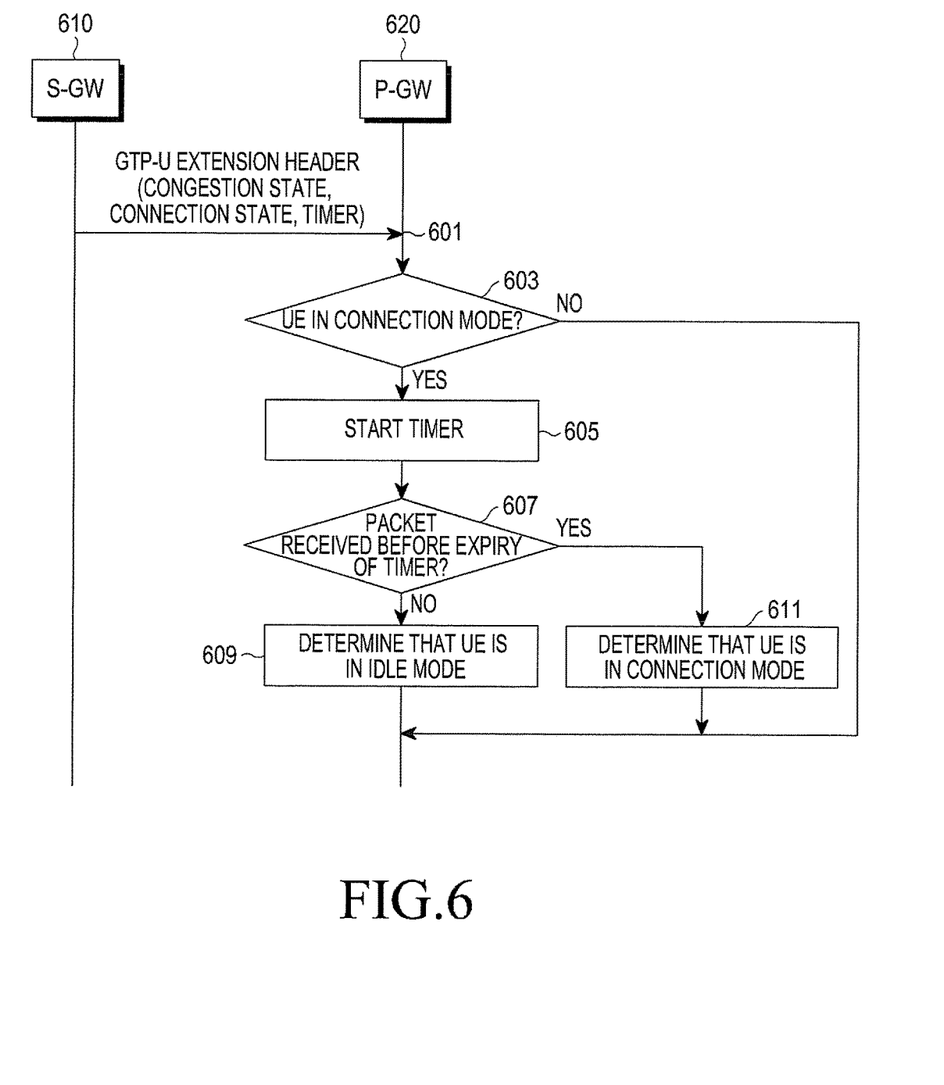
FIG. 6 is a signal flow diagram illustrating a process of determining UE's state information based on a timer according to an embodiment of the present disclosure.

FIG. 6 is a signal flow diagram illustrating a process of determining UE's state information based on a timer according to an embodiment of the present disclosure.

Referring to FIG. 6, an S-GW 610 may transmit UE's state information that the S-GW 610 has, to a P-GW 620 by inserting the information in a packet header (e.g., a GTP-U extension header) in operation 601. The UE's state information may include congestion state information indicating whether the UE is connected to a RAN node in a congestion state, and connection state information indicating whether the connection mode is performed by the UE. The UE's state information may additionally include information about the time the UE is predicted to switch to the idle mode.

The P-GW 620 may obtain the UE's state information by receiving the GTP-U extension header from the S-GW 610. In operation 603, the P-GW 620 may determine whether the connection mode is performed by the UE, based on the UE's state information. If the connection mode is performed by the UE, the P-GW 620 may start a timer in operation 605. This process may be performed if a timer value is included in the UE's state information, and the P-GW 620 may start the timer using the timer value included in the UE's state information. If no timer value is included in the UE's state information, a timer value may be set as a preset value in the P-GW 620, and the timer may be started.

In operation 607, the P-GW 620 may determine whether a packet is received before expiry of the timer. If no packet is received before expiry of the timer, the P-GW 620 may determine in operation 609 that the idle mode is performed by the UE. However, if a packet is received before expiry of the timer, the P-GW 620 may determine in operation 611 that the connection mode is performed by the UE, and may initialize the timer value.

Another method of determining UE's state information may include a method in which a P-GW obtains UE's state information by requesting the UE's state information from an S-GW. The P-GW may transmit the UE's state information that the P-GW itself has, to the S-GW, or may explicitly request the S-GW to provide the UE's state information.

If the S-GW receives a request for the UE's state information from the P-GW, or if the UE's state information transmitted by the P-GW is different from the UE's state information that the S-GW itself has, then the S-GW may transmit the UE's state info ration that the S-GW itself has, to the P-GW by inserting the information in a response message. For communication between the P-GW and the S-GW, a GPRS Tunneling Protocol-Control plane (GTP-C) message or a GTP-U extension header may be used.

This method will be described in detail with reference to FIG. 7.

Figure 7:
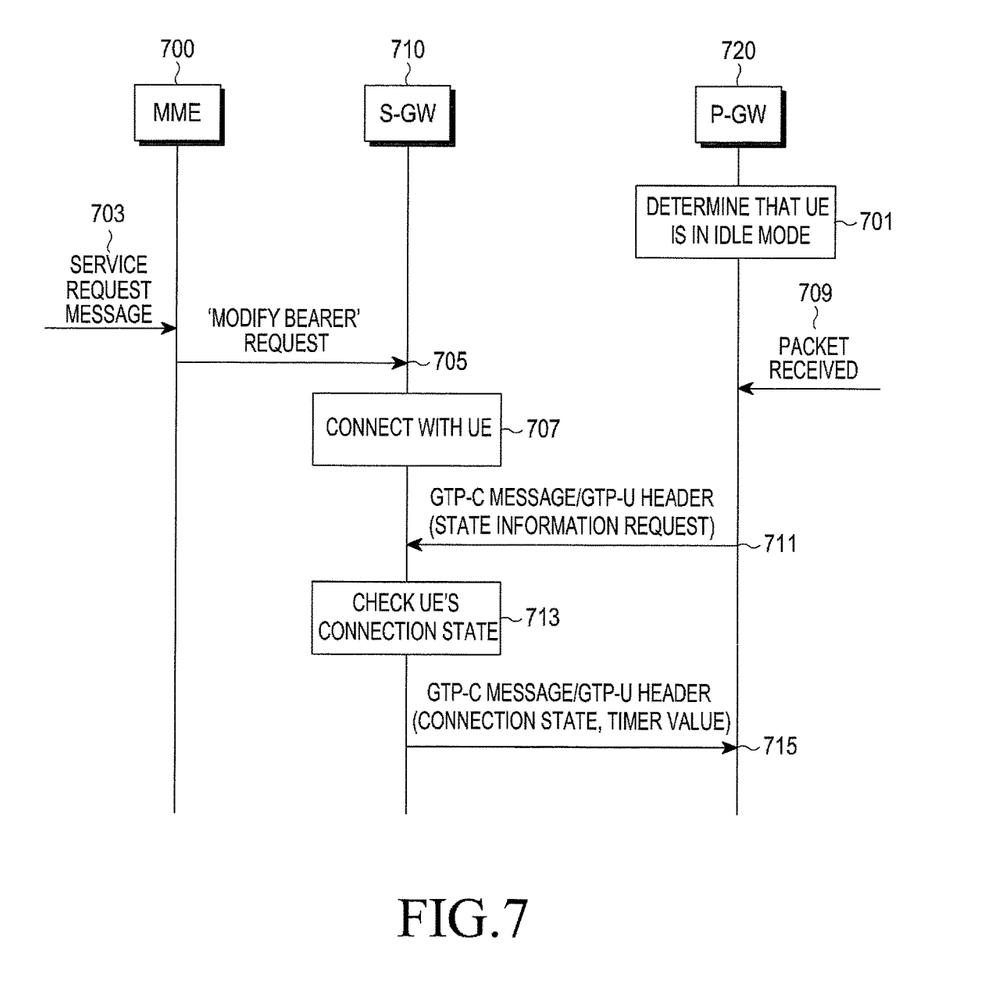
FIG. 7 is a signal flow diagram illustrating a process of requesting and receiving UE's state information according to an embodiment of the present disclosure.

FIG. 7 is a signal flow diagram illustrating a process of requesting and receiving UE's state information according to an embodiment of the present disclosure.

Referring to FIG. 7, while a P-GW 720 determines in operation 701 that a UE is in an idle mode, an MME 700 may receive a service request message for service request from the UE in operation 703. In operation 705, the MME 700 may send a 'Modify Bearer' request message to an S-GW 710, for service provision, and the S-GW 710 may generate a bearer to connect with the UE in operation 707.

In operation 709, the P-GW 720 may receive a packet. In this case, the P-GW 720 may send a GTP-C message or a GTP-U extension header requesting the UE's state information to the S-GW 710 in operation 711, in order to determine whether the state of the UE is changed. In response, the S-GW 710 may check the UE's connection state in step 713, and send a GTP-C message or a GTP-U extension header including the connection state information and timer value to the P-GW 720 in operation 715. Accordingly, based on the connection state information and the timer value, the P-GW 720 may determine whether the UE keeps the idle mode or has switched to the connection mode.

Next, a detailed description will be made of the third method of transmitting location information of a UE according to an embodiment of the present disclosure.

In order to perform traffic control taking into account a congestion state of a RAN, a P-GW needs to determine which UE is currently present in which cell, because congestion control may be applied for a RAN in which congestion has actually occurred, and a UE being served by the RAN. To this end, a method illustrated in FIG. 8 may be used.

Figure 8:
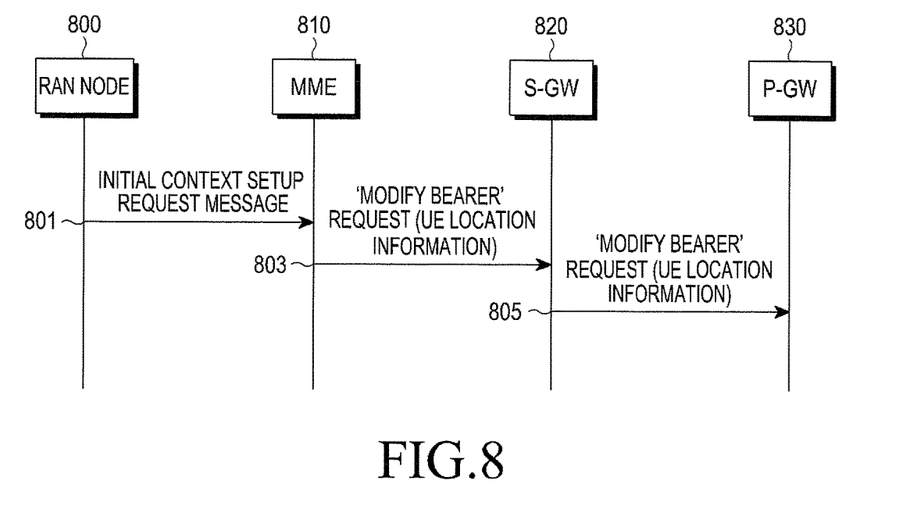
FIG. 8 is a signal flow diagram illustrating a process of transmitting UE's location information according to an embodiment of the present disclosure.

FIG. 8 is a signal flow diagram illustrating a process of transmitting UE's location information according to an embodiment of the present disclosure.

In the process shown in FIG. 8, when a UE is switched from an idle mode to a connection mode, the UE's location information may be delivered to a P-GW 830 via an MME 810 and an S-GW 820.

Referring to FIG. 8, if the UE is switched from the idle mode to the connection mode, a RAN node 800 may send an initial context setup request message to the MME 810 in operation 801, in order to activate a context of the UE.

In response, the MME 810 may set up a context of the UE and detect UE's location information based on the set context of the UE. The MME 810 may transmit the UE's location information to the S-GW 820 in operation 803, and the S-GW 820 may transmit the UE's location information to the P-GW 830 in operation 805.

The UE's location information transmitted from the MME 810 and the S-GW 820 may include location information (geographical location) of a RAN that the UE is accessing, information about the RAN node that the UE is accessing, a cell ID, a Tracking Area (TA) ID and the like, and may be included in a 'Modify Bearer' request message.

The process illustrated in FIG. 8 may be performed based on the messages which are exchanged between GWs through a PDN connection, and may be performed each time the UE is connected. Since the UE's location information should continuously updated depending on the movement of the UE, the UE's location information needs to be transmitted each time the UE's location is changed. Therefore, the method illustrated in FIG. 8 may suffer from an increase in signaling load in the network.

Given that the UE's location is changed from time to time and the RAN's congestion state is also dynamically changed, the above method may decrease in the efficiency. In particular, since the P-GW 830 needs to obtain the UE's location information when the UE is accessing a congested RAN, it is not necessary and inefficient for the P-GW 830 to receive the UE's location information each time the UE's location is changed. Therefore, a method of collectively transmitting information that makes it possible to know the congestion state and the UE's location may be used as illustrated in FIG. 9.

Figure 9:
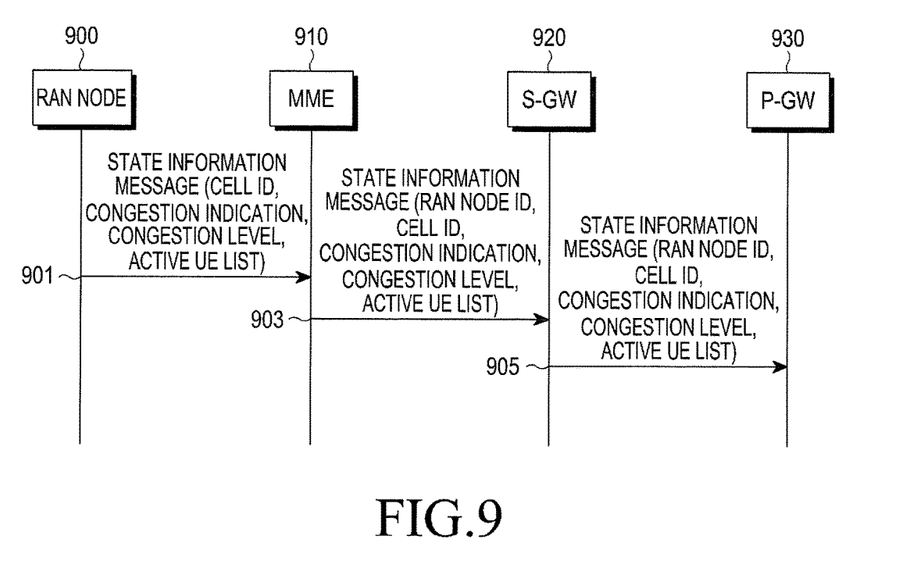
FIG. 9 is a signal flow diagram illustrating a process of transmitting information that makes it possible to know a congestion state and a UE's location according to an embodiment of the present disclosure.

FIG. 9 is a signal flow diagram illustrating a process of transmitting information that makes it possible to know a congestion state and a UE's location according to an embodiment of the present disclosure.

Referring to FIG. 9, a RAN node 900 may send a state information message including a cell ID, congestion indication, a congestion level and an active UE list, to an MME 910 in operation 901. The congestion indication may be set as information (e.g., a flag value) indicating whether congestion has occurred in a cell that the UE is accessing, and the congestion level may include information indicating a degree of congestion of the cell that the UE is accessing. The active UE list may include information about UEs, which are included in the cell that the UE is accessing, and which are in an active state (or connection mode).

In operation 903, the MME 910 may send, to an S-GW 920, a state information message including a RAN node's ID, a cell ID, congestion indication, a congestion level and an active UE list. In operation 905, the S-GW 920 may send the state information message received from the MME 910, to a P-GW 930. Based on the information included in the state information message, the P-GW 930 may determine whether the UE is accessing the congested cell, or is in the connection state.

Since an S-GW may generally track the UE's location, if the UE's location is changed or the UE's state is changed, the S-GW may transmit the change information to a P-GW (or PCEF, BBERF and the like). Therefore, the S-GW may obtain the UE's location information, information indicating whether the UE is connected to a RAN, and information indicating whether the UE is accessing a congested RAN, and transmit only the changed information to the P-GW, thereby making it possible to further reduce the signaling load in the network. This method will be described with reference to FIG. 10.

Figure 10:
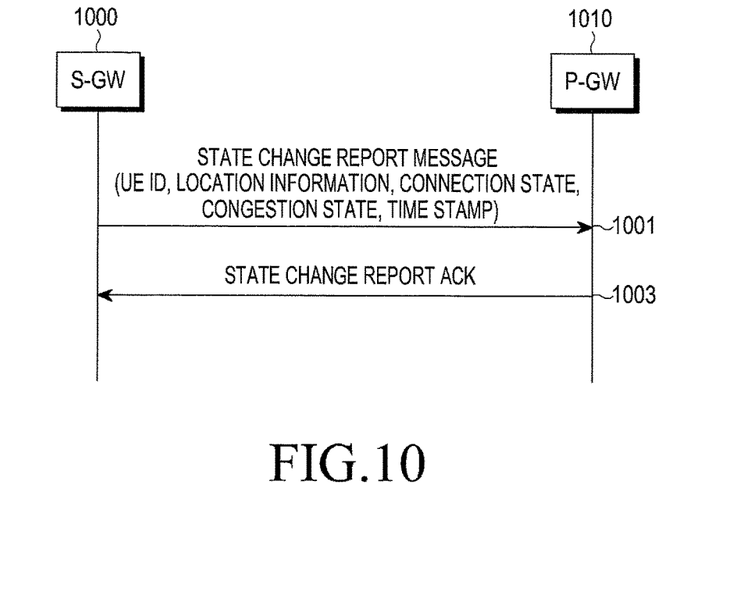
FIG. 10 is a signal flow diagram illustrating a process of sending a state change report message for a UE according to an embodiment of the present disclosure.

FIG. 10 is a signal flow diagram illustrating a process of sending a state change report message for a UE according to an embodiment of the present disclosure.

Referring to FIG. 10, an S-GW 1000 may send, to a P-GW 1010, a state change report message including an ID of a UE, connection state information of the UE, congestion state information of a RAN that the UE is accessing, and time stamp information, in operation 1001. The time stamp information may include information about the time the S-GW 1000 obtained information related to the UE.

Based on the information included in the state change report message, the P-GW 1010 may send a state change report ACK message to the S-GW 1000 in response to the state change report message in operation 1003, determining that the UE's location and state is changed.

A process is also needed, which is performed when a UE is handed over to another cell while receiving a service from a congested cell (or RAN). If the new cell to which the UE is handed over is also congested, traffic control caused by congestion should be continuously performed. However, if the new cell is not congested, traffic control caused by congestion should no longer be performed. To this end, the network entities should be able to determine that the UE has moved from the congested cell to another non-congested cell.

Therefore, in an embodiment of the present disclosure, upon occurrence of handover, the existing RAN node may transmit, to a new RAN node, information indicating that the UE has received a service from the congested cell. Based on the information, the new RAN node may determine whether it should transmit information indicating whether congestion control for the UE is applied, to other network entities (e.g., MME, S-GW, P-GW and the like). This process will be described in detail with reference to FIG. 11.

Figure 11:
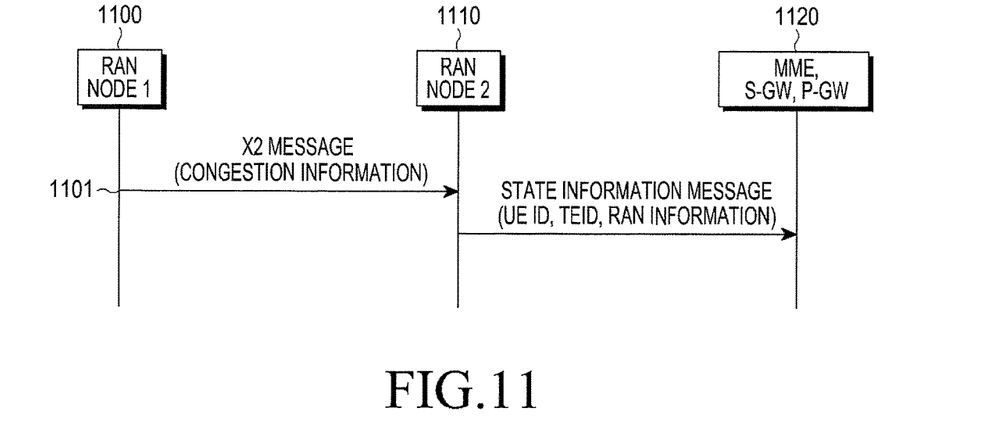
FIG. 11 is a signal flow diagram illustrating a process in which congestion information is exchanged between RAN nodes upon occurrence of handover according to an embodiment of the present disclosure.

FIG. 11 is a signal flow diagram illustrating a process in which congestion information is exchanged between RAN nodes upon occurrence of handover according to an embodiment of the present disclosure.

Referring to FIG. 11, if a UE, which has been receiving a service from a first RAN node 1100, is handed over from the first RAN node 1100 to a second RAN node 1110, the first RAN node 1100 may transmit congestion information for the first RAN node 1100 to the second RAN node 1110 in operation 1101. In the case of an X2 handover, the congestion information may be included in an X2 message (e.g., a handover request message), and in the case of an S1 handover, the congestion information may be included in a source-to-target transparent container message. In addition, the congestion information may include an IE (e.g., congestion state IE) indicating whether a cell managed by the first RAN node is congested, and a degree of the congestion.

Based on the congestion information, the second RAN node 1110 which has received the congestion information may determine whether it should perform traffic processing for the UE, and should send a state information message including information (e.g., information indicating whether congestion control is applied, UE's location information, UE ID, Tunneling Endpoint ID (TEID), and information about a RAN that the UE is accessing) related to the UE, to other network entities 1120 such as MME, S-GW and P-GW (e.g., PCEF, BBERF, TDF). If the second RAN node 1110 should send the state information message, the second RAN node 1110 may transmit the state information to the other network entities 1120 in operation 1103.

When determining whether it should send the state information message, the second RAN node 1110 may use information indicating whether the first RAN node 1100 and the second RAN node 1110 are congested. If both of the first RAN node 1100 and the second RAN node 1110 are not congested (e.g., if the UE is handed over from a non-congested RAN to another non-congested RAN), the second RAN node 1110 doesn't need to send the state information message. On the other hand, if a congestion state of a RAN before handover is different a congestion state of a RAN after handover, the state information message needs to be sent.

If the first RAN node 1100 is congested and the second RAN node 1110 is not congested (e.g., if the UE is handed over from a congested RAN to a non-congested RAN), the data packets, which were not transmitted in the congested RAN due to the congestion control, may be first transmitted to the UE after handover.

Figure 12:
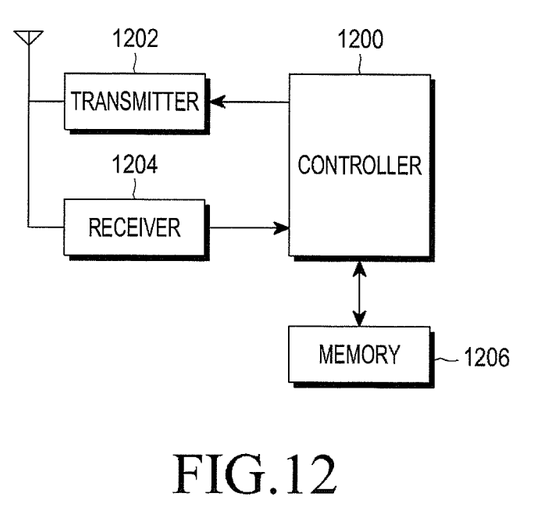
FIG. 12 is a block diagram of a transmitting node according to an embodiment of the present disclosure.
Figure 13:
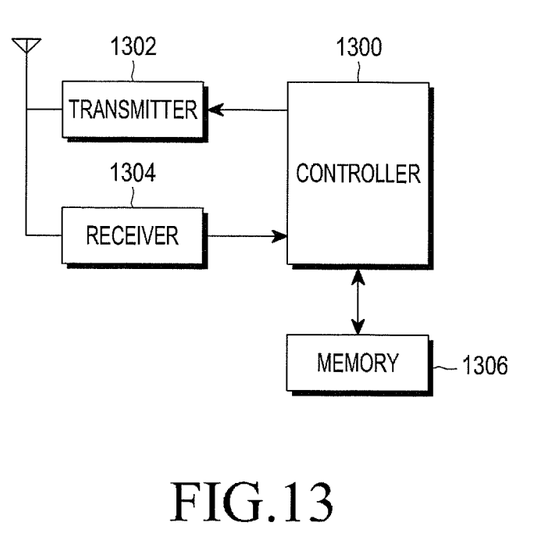
FIG. 13 is a block diagram of a receiving node according to an embodiment of the present disclosure.

Reference will now be made to FIGS. 12 and 13 to describe internal structures of a transmitting node and a receiving node according to an embodiment of the present disclosure. The transmitting node represents a network entity that transmits information (hereinafter referred to as 'congestion control information') such as a congestion state, a congestion level, a connection state, UE's location information, and an active UE list according to an embodiment of the present disclosure. The receiving node represents a network entity receiving the congestion control information according to an embodiment of the present disclosure, and may correspond to the above-described execution node.

FIG. 12 is a block diagram of a transmitting node according to an embodiment of the present disclosure.

Referring to FIG. 12, the transmitting node may include a controller 1200, a transmitter 1202, a receiver 1204, and a memory 1206.

The transmitter 1202 and the receiver 1204 are components for transmitting and receiving congestion control information (e.g., various messages, signals and information exchanged over the network).

The memory 1206 may store various information generated according to an operation of the transmitting node, and various signals which are transmitted and received. For example, the memory 1206 may store the UE-related information and the congestion control information, which are transmitted and received through the transmitter 1202 and the receiver 1204.

The controller 1200 may control the overall operation of the transmitting node by controlling the transmitter 1202, the receiver 1204 and the memory 1206. In particular, the controller 1200 may control the components to perform the operation of the transmitting node, which has been described in conjunction with FIGS. 4 to 11, according to an embodiment of the present disclosure.

FIG. 13 is a block diagram of a receiving node according to an embodiment of the present disclosure.

The receiving node may include a controller 1300, a transmitter 1302, a receiver 1304 and a memory 1306.

The transmitter 1302 and the receiver 1304 may transmit and receive congestion control information (e.g., various messages, signals and information exchanged over the network).

The memory 1306 may store various information generated according to an operation of the receiving node, and various signals which are transmitted and received. For example, the memory 1306 may store the UE-related information and the congestion control information, which are transmitted and received through the transmitter 1302 and the receiver 1304.

The controller 1300 may control the overall operation of the receiving node by controlling the transmitter 1302, the receiver 1304 and the memory 1306. In particular, the controller 1300 may control the components to perform the operation of the receiving node, which has been described in conjunction with FIGS. 4 to 11, according to an embodiment of the present disclosure.

As is apparent from the foregoing description, the present disclosure may effectively inform a congestion state of a cell that a UE is accessing, by using the existing user plane message without signaling load in the wireless communication system. In addition, the present disclosure may allow a specific network node to determine whether a UE is in an idle mode, thereby making it possible to perform traffic control taking into account the UE's state. Further, the present disclosure may accurately determine UE's location information, thereby making it possible to provide a service suitable for a state of the UE even if the UE has undergone handover.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting congestion information by a radio access network (RAN) node in a wireless communication system, the method comprising:
   detecting congestion based on monitoring of the RAN node; and
   transmitting the congestion information related to the detected congestion to a traffic control node,
   wherein the congestion information is used to control the congestion for a user equipment (UE) being served by the RAN node, and is included in an extension header of an uplink general packet radio service (GPRS) tunneling protocol-user plane (GTP-U) packet transmitted in a user plane, and
   wherein a cell identifier (ID) is included in the extension header of the uplink GTP-U packet, when a congestion status of the RAN node or a location of the UE changes.

2. The method of claim 1, wherein the congestion information includes at least one of an identifier (ID) of the RAN node, a congestion indication indicating whether the congestion is detected, a congestion level indicating a degree of the congestion, a load reduction factor indicating an amount of load that needs to be reduced for congestion control, and information about UEs in an active state, which are accessing the RAN node.

3. The method of claim 1, wherein the congestion information is included in all uplink GTP-U packets.

4. A radio access network (RAN) node in a wireless communication system, the RAN node comprising:
a processor configured to detect congestion based on monitoring of the RAN node; and
a transmitter configured to transmit congestion information including information related to the detected congestion to a traffic control node,
wherein the congestion information is used to control the congestion for a user equipment (UE) being served by the RAN node, and is included in an extension header of an uplink general packet radio service (GPRS) tunneling protocol-user plane (GTP-U) packet transmitted in a user plane, and
wherein a cell identifier (ID) is included in the extension header of the uplink GTP-U packet, when a congestion status of the RAN node or a location of the UE changes.

5. The RAN node of claim 4, wherein the congestion information includes at least one of an identifier (ID) of the RAN node, a congestion indication indicating whether the congestion is detected, a congestion level indicating a degree of the congestion, a load reduction factor indicating an amount of load that needs to be reduced for congestion control, and information about UEs in an active state, which are accessing the RAN node.

6. The RAN node of claim 4, wherein the congestion information is included in all uplink GTP-U packets.

7. A method for receiving congestion information by a traffic control node in a wireless communication system, the method comprising:
receiving the congestion information of a radio access network (RAN) node, the congestion information being related to congestion detected based on monitoring of the RAN node,
wherein the congestion information is used to control the congestion for a user equipment (UE) being served by the RAN node, and is included in an extension header of an uplink general packet radio service (GPRS) tunneling protocol-user plane (GTP-U) packet transmitted in a user plane, and
wherein a cell identifier (ID) is included in the extension header of the uplink GTP-U packet, when a congestion status of the RAN node or a location of the UE changes.

8. The method of claim 7, wherein the congestion information includes at least one of an identifier (ID), a congestion indication indicating whether the congestion is detected, a congestion level indicating a degree of the congestion, a load reduction factor indicating an amount of load that needs to be reduced for congestion control, and information about UEs in an active state, which are accessing the RAN node.

9. The method of claim 7, wherein the congestion information is included in all uplink GTP-U packets.

10. The method of claim 7, in response to an operating mode of the UE is determined as a connection mode based on state information included in the extension header of the uplink GTP-U packet of the UE, further comprising:
starting a timer;
determining whether an uplink packet is received before the timer expires; and
identifying that the operating mode of the UE is switched from the connection mode to an idle mode based on a result of the determination.

11. The method of claim 10, wherein the state information of the UE includes at least one of information indicating whether the UE is connected to the RAN node that the congestion is detected, information indicating whether the operating mode of the UE is any one of the connection mode and the idle mode, and information about a timer value used to start the timer.

12. The method of claim 10, wherein the state information of the UE includes a mode indicator indicating whether the operating mode of the UE is one of the connection mode and the idle mode is, and is included in a modify bearer request message.

13. The method of claim 10, wherein the state information of the UE is received if the operating mode of the UE is changed, or received according to a request of the traffic control node.

14. A traffic control node in a wireless communication system, the traffic control node comprising:
a receiver configured to receive, from a radio access network (RAN) node, congestion information being related to congestion detected based on monitoring of the RAN node,
wherein the congestion information is used to control the congestion for a user equipment (UE) being served by the RAN node, and is included in an extension header of an uplink general packet radio service (GPRS) tunneling protocol-user plane (GTP-U) packet transmitted in a user plane, and
wherein a cell identifier (ID) is included in the extension header of the uplink GTP-U packet, when a congestion status of the RAN node or a location of the UE changes.

15. The traffic control node of claim 14, wherein the congestion information includes at least one of an identifier (ID), a congestion indication indicating whether the congestion is detected, a congestion level indicating a degree of the congestion, a load reduction factor indicating an amount of load that needs to be reduced for congestion control, and information about UEs in an active state, which are accessing the RAN node.

16. The traffic control node of claim 14, wherein the congestion information is included in all uplink GTP-U packets.

17. The traffic control node of claim 14, in response to an operating mode of the UE is determined as a connection mode based on state information included in the extension header of the uplink GTP-U packet of the UE, further comprising:
a controller configured to:
start a timer;
determine whether an uplink packet is received before the timer expires; and
identify that the operating mode of the UE is switched from the connection mode to an idle mode based on a result of the determination.

18. The traffic control node of claim 17, wherein the state information of the UE includes at least one of information indicating whether the UE is connected to the RAN node that the congestion is detected, information indicating whether the operating mode of the UE is any one of the connection mode and the idle mode, and information about a timer value used to start the timer.

19. The traffic control node of claim 17, wherein the state information of the UE includes a mode indicator indicating whether the operating mode of the UE is one of the connection mode and the idle mode is, and is included in a modify bearer request message.

20. The traffic control node of claim 17, wherein the state information of the UE is received if the operating mode of the UE is changed, or received according to a request of the traffic control.

* * * * *